United States Patent [19]

Yamaguchi

[11] Patent Number: 5,237,409
[45] Date of Patent: Aug. 17, 1993

[54] COLOR IMAGE FORMING APPARATUS USING COLOR COMPRESSED COLOR DATA

[75] Inventor: Toshiyuki Yamaguchi, Toyoake, Japan

[73] Assignee: Brother Kogyo Kabushiki Kaisha, Nagoya, Japan

[21] Appl. No.: 978,199

[22] Filed: Nov. 18, 1992

Related U.S. Application Data

[63] Continuation of Ser. No. 756,890, Sep. 9, 1991, abandoned.

[30] Foreign Application Priority Data

Sep. 10, 1990 [JP] Japan .................................. 2-240748
Sep. 10, 1990 [JP] Japan .................................. 2-240749

[51] Int. Cl.$^5$ ............................................. H04N 11/04
[52] U.S. Cl. ........................................ 358/133; 358/13; 358/518
[58] Field of Search .................... 358/75, 80, 11–13, 358/133–136, 76–79

[56] References Cited

U.S. PATENT DOCUMENTS

| | | | |
|---|---|---|---|
| 3,825,673 | 7/1974 | Schreiner et al. | 178/5.4 HE |
| 4,060,829 | 11/1977 | Sakamoto | 358/80 |
| 4,458,265 | 7/1984 | Yoshida et al. | 358/80 |
| 4,670,780 | 6/1987 | McManus et al. | 358/80 |
| 4,758,885 | 7/1988 | Sasaki et al. | 358/80 |
| 4,796,086 | 1/1989 | Ohta et al. | 358/80 |
| 4,839,722 | 6/1989 | Barry et al. | 358/80 |
| 4,847,677 | 7/1989 | Music et al. | 358/136 |
| 4,857,993 | 8/1989 | Music et al. | 358/133 |
| 4,875,032 | 10/1989 | McManus et al. | 340/703 |
| 4,914,508 | 4/1990 | Music et al. | 358/13 |
| 4,941,038 | 7/1990 | Walowit | 358/80 |
| 4,941,039 | 7/1990 | E'Errico | 358/80 |
| 4,958,220 | 9/1990 | Alessi et al. | 358/76 |
| 4,959,711 | 9/1990 | Hung | 358/80 |
| 4,970,585 | 11/1990 | Kurata | 358/75 |
| 4,972,257 | 11/1990 | Birnbaum et al. | 358/80 |
| 5,047,853 | 9/1991 | Hoffert et al. | 358/133 |
| 5,053,866 | 10/1991 | Johnson | 358/75 |
| 5,086,339 | 2/1992 | Gausland | 358/81 |
| 5,105,469 | 4/1992 | MacDonald | 382/17 |
| 5,136,400 | 8/1992 | Yamaguchi | 358/300 |

*Primary Examiner*—Stephen Brinich
*Attorney, Agent, or Firm*—Oliff & Berridge

[57] ABSTRACT

A color image forming apparatus is provided for reproducing, on an image output medium, an original color image formed on an image input medium. In the color image forming apparatus, a color distribution state of the original color image is detected. A color image data of a color of each of picture elements of the original color image is obtained. There is obtained a control signal for controlling its recording portion to record a color corresponding to the color of the original color image, on the basis of the color image data through such a color-compression transformation as depends on the detected color distribution state of the original color image. The recording portion of the color image forming apparatus therefore reproduces the original color image on the image output medium with sufficient reproducibility irrespective of color distribution of the original color image.

24 Claims, 10 Drawing Sheets

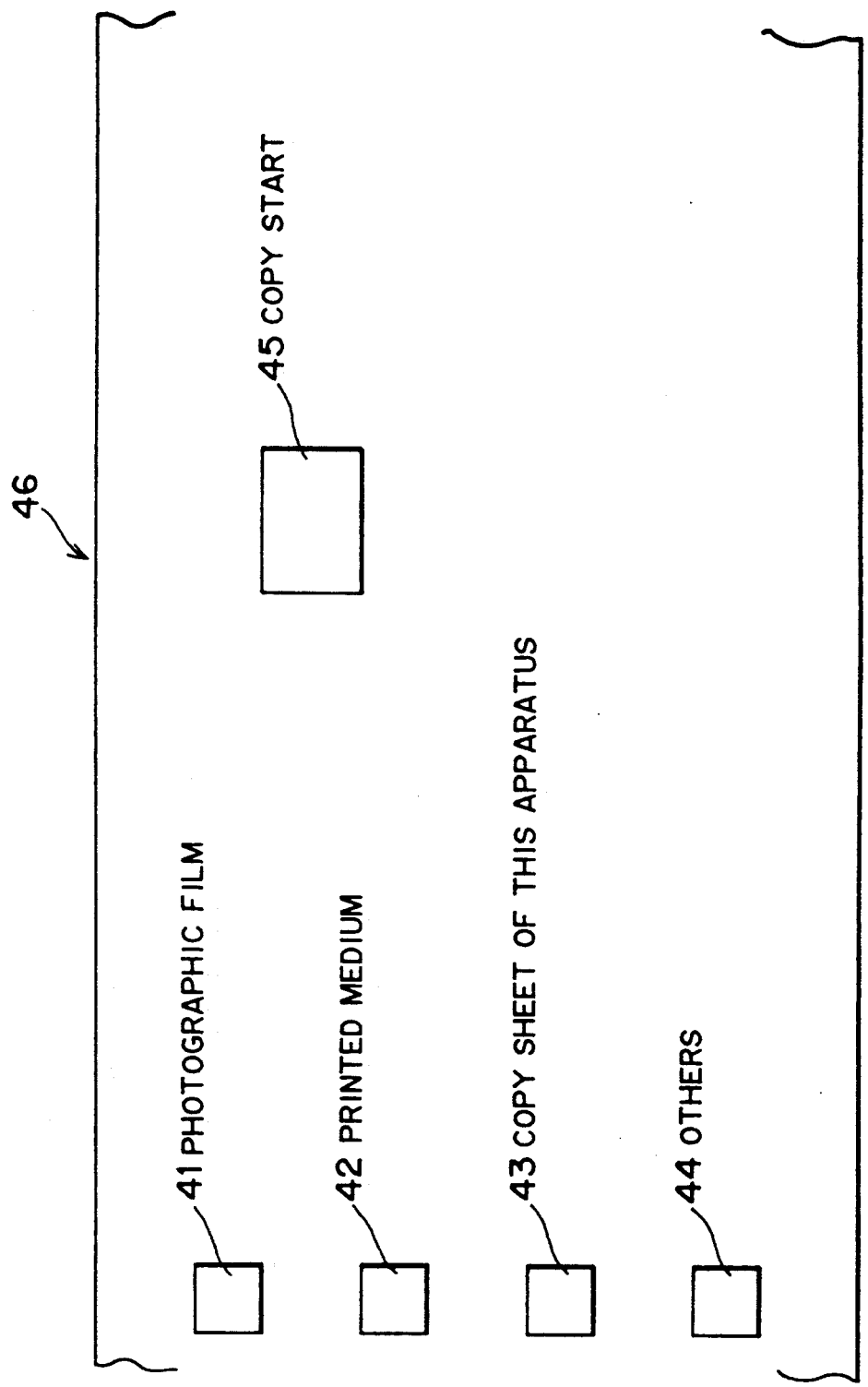

COLOR IMAGE FORMING APPARATUS USING COLOR COMPRESSED COLOR DATA

This is a continuation of application Ser. No. 07/756,890 filed Sep. 9, 1991, now abandoned.

BACKGROUND OF THE INVENTION

This invention relates to a color image forming apparatus, and more particularly to a color image forming apparatus capable of reproducing a color image with high reproducibility irrespective of color distribution of the color image.

There has been known an image forming apparatus in which an original color image on an image input medium such as a color photographic film, a television, a copy sheet or the like is read out by an image reader to obtain an original image data, the original image data is separated into three color components (red, green and blue image data) for every picture element. The original image data is transformed or color-proofed into a control signal data. The control signal data controls a recording means of the image forming apparatus to record, on an image output medium, a color image which has the same colors as the original image formed on the image input medium, as a result of which the original image formed on the image input medium is reproduced on the image output medium. The image output medium is such as a copy sheet, a television, a coated or non-coated sheet or the like.

In this description, each of the image input media and the image output media is defined as a medium for forming or producing a visible color image thereon. The medium is referred to as "image input medium" when the medium is used as an original from which an original image is read by the image reading unit, while the medium is referred to as "image output medium" when the medium is used as a recording medium on which the original image is reproduced.

Color-reproducible ranges of the image input and output media are determined in accordance with kinds of image forming manners or image forming systems utilized in the image input and output media. Kinds of the image input and output media such as the color photographic film, copy sheet, television, printed sheet or the like are determined in accordance with the kinds of the image forming systems utilized in the image input and output media. Therefore, the color-reproducible ranges of the image input and output media are determined in accordance with kinds of the image input and output media. In the above-described image forming apparatus, inconsistency in color (color error or color difference) between the original image and the image reproduced on the image output medium frequently occurs when a color-reproducible range (gamut) of the image input medium is inconsistent with that of the image output medium. A color located within the color-reproducible range (gamut) of the image input medium is reproduced on the image output medium with insufficient color-reproducibility, in the case where the color of the image input medium is located outside of the color-reproducible range (gamut) of the image output medium.

Various techniques (color-correcting techniques) for correcting an original image data have been utilized to correct such a color-inconsistency (decrease such a color error) and improve the color-reproducibility of the original image.

As one of the color-correcting techniques is known a color compression technique (a data-compression transform technique). In the data-compression transform technique, a color represented by a color information signal data is compressed in an achromatic (neutral) color direction under an invariable compression rule to obtain a color-compressed color which is located within the color-reproducible range of the image output medium and therefore can be recorded or reproduced on the image output medium. Thus obtained data of color-compressed color is color-proofed to produce the control signal for driving the recording means to record or reproduce the color-compressed color on the image output medium. Thereafter, a color recording operation is carried out using cyan, magenta and yellow inks or toners by the recording means in accordance with the obtained control signal data.

In this description, the achromatic color is defined as a color having a lightness, but no hue and chromaticness (saturation). White, gray and black colors belong to the achromatic color, and are decreased in lightness in this order. In the following description, a color axis on which achromatic colors having various lightnesses (white, gray and black) are located is referred to as "achromatic color axis". The achromatic color on the achromatic color axis is shifted up to the white color as a lightness thereof is increased, and down to the black color as the lightness is decreased. An achromatic color direction is defined as a direction in which any color is directed to an achromatic color on the achromatic axis in a color space. As described below, the color-compression process is a data-correcting process for shifting (color-compressing) a color within the color-reproducible range (gamut) of the image input medium to a color within the color-reproducible range (gamut) of an image output medium in the color space.

As described above, in order to record or reproduce an original image whose color is within a color-reproducible range (gamut) of the image input medium but is out of a color-reproducible range (gamut) of the image output medium, in the color-compression process, a color image data of the original image is corrected such that the color of the original image is shifted to a suitable color within the color-reproducible range (gamut) of the image output medium in the chromaticity diagram (color space). In other words, the original image data is corrected such that the color of the original image is shifted in a direction toward a point on the achromatic color axis to produce a color located within a color-reproducibility of the image output medium. This color-correcting process is hereinafter referred to as "a color-compression process in an achromatic color direction".

In the conventional image forming apparatus adopting the above color-compression process, a color-compression parameter with which the original image data is color-compressed is beforehand determined as an invariable value for attaining a predetermined invariable compression rule, and is beforehand stored in a memory means of the apparatus.

In general, each of original color images formed on the image input media has an inherent color distribution. That is, the colors of each original color image falling within the image input medium gamut has an inherent distribution with respect to the image output medium gamut. More specifically, each of the original color images has an inherent ratio or degree of colors located within the image output medium gamut with respect to other colors located outside of the image output medium gamut. In other words, each of the original color images has an inherent ratio of colors which can be recorded by the recording means and other colors which may not be recorded by the recording means. Thus, the ratios of colors recordable by the recording means with respect to colors unrecordable by the recording means are different from one another, in accordance with the original color images.

The conventional compression technique as described above, however, subjects all of the original images to the predetermined invariable compression process utilizing the invariable color-compression parameter irrespective of the difference of the color distribution of the original color images, and thus causes some original images to be reproduced with insufficient contrast due to an excessive color-compression or to be reproduced with saturation colors due to insufficient color compression, with the result that a sufficient color reproducibility is not obtained.

SUMMARY OF THE INVENTION

An object of this invention is to provide an image forming apparatus capable of reproducing a color image having a color located outside of the color-reproducible range (gamut) of an image output medium with sufficient color-reproducibility.

Another object of this invention is to provide an image forming apparatus capable of reproducing a color image with excellent color-reproducibility irrespective of a color distribution of an original image. That is, the object of the present invention is to provide an image forming apparatus capable of attaining an excellent color reproducibility for any kind of original having various color distributions.

In order to attain the above objects, the present invention provides a color image forming apparatus for obtaining a color image data representing each color of an original color image formed on an image input medium and forming, on an image output medium, a color image corresponding to the original color image, the color image forming apparatus comprising: image input means for inputting a color image data of the original color image for each picture element; color distribution detecting means for detecting color distribution of the original color image to generate color distribution information of the original color image; control signal producing means for producing a control signal on the basis of the color image data through color-compression transformation which is determined in accordance with the color distribution information of the original color image; and image recording means for recording a color image on the image output medium on the basis of the control signal.

Other objects, features and advantages of the present invention will become apparent in the following specification and accompanying drawings.

BRIEF DESCRIPTION OF THE DRAWINGS

FIG. 2(b) shows an operational panel provided on the color copying machine;

DETAILED DESCRIPTION OF THE INVENTION

Figure 1:
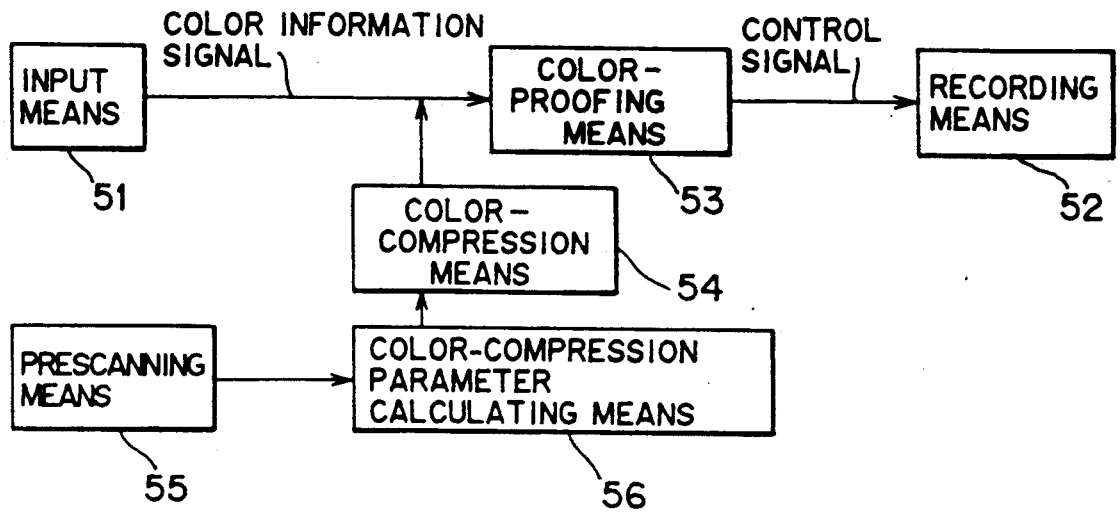
FIG. 1 is a block diagram of a first embodiment of an image forming apparatus of the present invention.

FIG. 1 is a block diagram of the basic construction of a first embodiment of a color image recording apparatus of this invention.

The color image recording apparatus of this embodiment includes an input means 51 for obtaining an original color information signal corresponding to a color of a color original image; a recording means 52 for carrying out a color recording process using at least three coloring materials of cyan, magenta and yellow; pre-scanning means 55 for preliminarily scanning (pre-scanning) the color original prior to a main scanning operation to thereby obtain a color distribution information of the color original image; color-compression parameter calculating means 56 for obtaining a parameter to be used in a color-compression transforming process on the basis of the obtained color distribution information; color-compression means 54 for transforming the original color information signal into color data recordable by the recording means 52 with using the color-compression parameter; and color-proofing means 53 for color-proofing the color data to obtain a control signal for controlling the recording means 52 to record a color substantially the same as that of the original color image.

In the image recording apparatus thus constructed, the color original is first roughly scanned by the pre-scanning means 55 to obtain the color distribution information of the color original image. Then, the color-compression parameter is determined in accordance with the obtained color distribution information of the color original image. Then, the input means 51 obtains original color information signals for all the picture elements of the color original image. In accordance with the color-compression parameter, each of the obtained original color information signals is subjected to color-compression operation into a color data recordable by the recording means 52. The color data is subjected to color-proofing operation, e.g., matrix transformation, into a printing control signal for controlling the recording means 52 to record a color the same as that represented by the corresponding original color information signal. The color recording means 52 carries out a color recording operation with using cyan, magenta and yellow toners or inks in accordance with the obtained printing control signals to thereby reproduce the color original image.

Figure 2A:
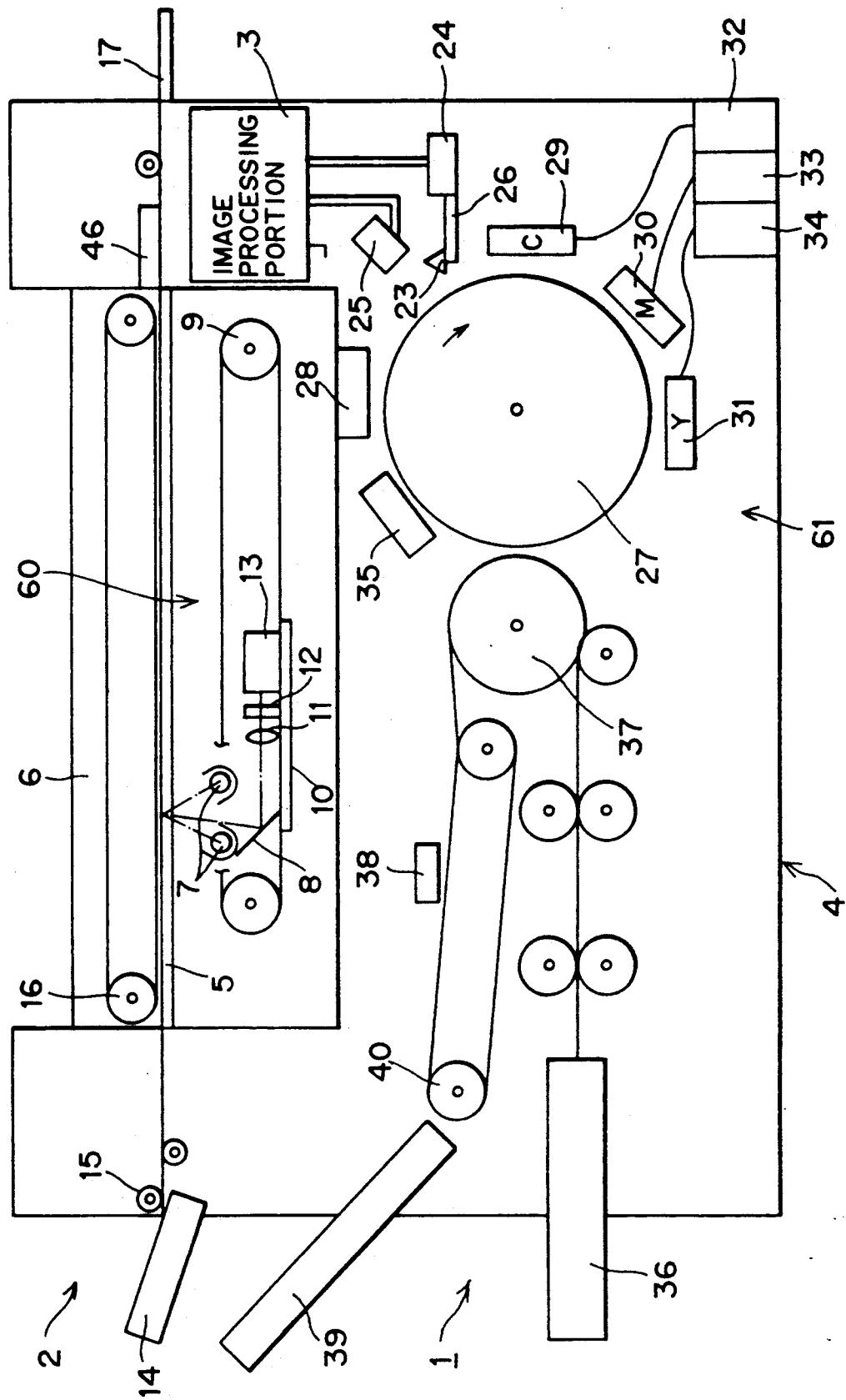
FIG. 2(a) shows a basic construction of a color copying machine to which applied are the image forming apparatuses of both the first and second embodiments.

FIG. 2(a) shows a representative construction of a digital color copying machine to which applied is a first embodiment of a color image recording apparatus of the present invention.

The digital color copying machine 1 includes an original color image reading portion 2 provided at upper side of the copying machine 1, a color image processing portion 3 provided at a right side of the copying machine 1, and a color image recording portion 4 provided at a lower side of the copying machine 1.

The original color image reading portion 2 serves as the input means 51 shown in FIG. 1 for obtaining the original image data corresponding to a color image formed on an original mounted on the original mount 5. The color image processing portion 3 serves as the color-compression means 54, the color-proofing means 53, the prescanning means 55, and the color-compression parameter calculating means 56. The color image recording portion 4 serves as the recording means 52.

The original color image reading portion 2 includes a transparent original mount 5 for mounting an original thereon, an original cover 6 for pressingly covering the original mounted on the original mount 5, an original supply stand 14 for supplying the original to the original mount 5, an original supply unit 15 provided at a right side of the original supply stand 14 for supplying the original from the original supply stand 14 to the original mount 5, an original feeding unit 16 which comprises two rollers rotated by a motor (not shown) and an endless belt suspended therebetween for feeding the original onto the original mount 5, an original discharge tray 17 provided at a right side of the original feeding unit 16 for withdrawing an exposed original, and an image reading unit 60 provided at a lower portion of the original mount 5 for exposing the original to light to obtain an original color image data from the original.

The image reading unit 60 of the image reading portion 2 includes two light sources (e.g. fluorescent lamps) 7 each extending in a widthwise direction of the original (in a main scanning direction) for emitting light toward the transparent original mount 5 and irradiating the light to the original mounted on the original mount 5 to thereby scan the original with the light, a reflection mirror 8 for reflecting an original image light reflected from the original, a lens 11 for converging the original image light from the reflection mirror 8, a color filter unit 12 for separating the original image light from the lens 11 into three (red, green and blue) color image components, and a solid-state image pick-up element (e.g. a line charge-coupled device (line CCD)) 13 provided behind the color filter unit 12 for receiving the original image light having the separated three color components and forming an original color image data on the basis of the original image light. If the solid-state image pick-up element 13 comprises a line CCD, the line CCD reads out an image information every line in a widthwise direction of the original (vertically to the drawing). The light sources 7, the reflection mirror 8, the lens 11, the color filter 12 and the solid-state image pick-up element 13 are mounted on a movable stand 10 which is moved by a moving unit 9 such as a pair of rotatable rollers in right and left directions (in an auxiliary scanning direction) in FIG. 2(a).

At a right side of the original cover 6, there is provided an operational panel 46 which has a copy starting switch or button 45 and various original kind selecting switches or buttons used for selecting a kind of an original to be copied by the copying machine 1. The operation panel 46 is shown in FIG. 2(b). The original kind selecting switches or buttons include, for example, a photographic original switch or button 41, a printed original switch or button 42, a switch or button 43 for a copy sheet formed by the copying machine 1 and switches or buttons 44 for other kinds of originals.

Figure 3:
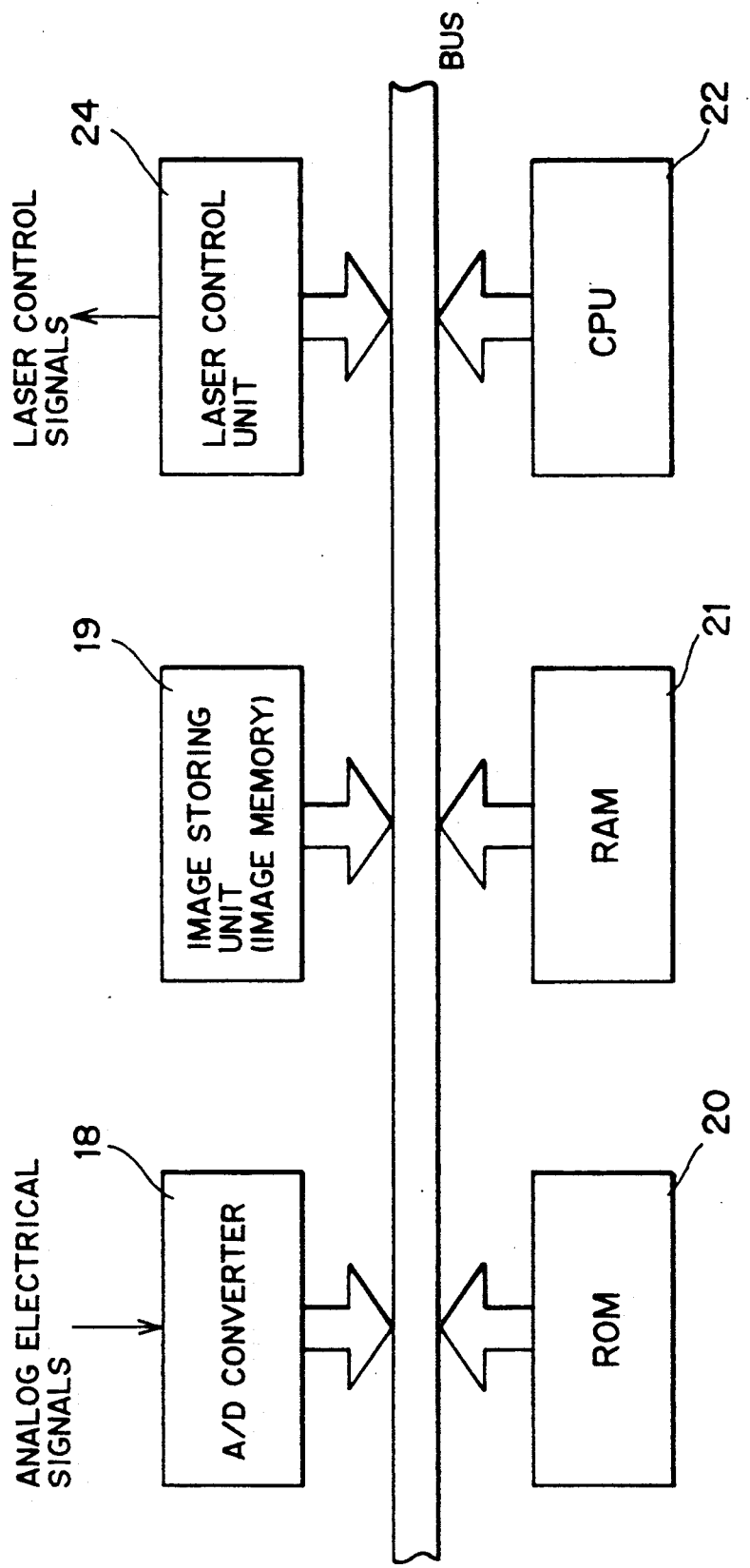
FIG. 3 is a block diagram for showing a color image processing portion of the color copying machine.

FIG. 3 is a block diagram for showing the color image processing portion 3.

As shown in FIG. 3, the color image processing portion 3 comprises an analog-to-digital (A/D) converter 18 for converting the original color image data (color information signal) obtained by the solid-state image pick-up element 13 into a digital color image data, an original image storing unit such as an image memory or a frame memory 19 for storing all or a part of the original color image data in a digital form, a ROM 20 serving as storing means for beforehand storing therein color-proofing coefficients used in color-proofing operations which have been beforehand calculated, a RAM 21 for storing various data indicating various processing results, a CPU 22 for performing various image processing using the ROM 20 and RAM 21, and a laser control unit 24 for controlling the driving of a laser source 23 such as a laser diode of the image recording system 4 on the basis of a printing control signal corresponding to a color-compressed image data. These elements are connected to one another through a bus.

The filter unit 12 includes three filter members for allowing only respective ones of red, green and blue color components of light to pass therethrough. The three filter members successively cover the image pick-up element 15 to allow the respective three components of the light from the original to be received by the image pick-up element 13, every image reading operation of one main line or one frame. Therefore, image signals each representing lightness of each of three color components of each picture element are outputted from the image pick-up element 13 every picture element. Each of the outputted three image signals of each picture element represents a lightness, and a group of the outputted image signals of the three color components of each picture element constitutes an original color data of lightness, hue and saturation of each picture element. The outputted image signals are converted into digital image signals by the A/D converter 18, and stored in the image storing unit 19.

The color image recording portion 4 includes the laser source 23 for emitting a laser beam, a laser modulation unit 26 for modulating the laser beam of the laser source 23 on the basis of the information from the laser control unit 24 and supplying the modulated laser beam to a polygon mirror 25, an electrophotographical image forming unit 61 for electrostatically forming a latent image through an exposing operation using the modulated laser beam reflected from the polygon mirror 25 and then forming a visible image corresponding the latent image on a recording sheet with toners, a fixing unit 38 for fixing the visible image on the sheet, and a sheet feeding unit 40 for discharging the fixed sheet to a discharge tray 39.

The electrophotographic image forming unit 61 includes a photosensitive drum 27 on which the latent image is electrophotographically formed by the modulated laser beam from the polygon mirror 25, a charging unit 28 provided near to the photosensitive drum 27 for charging the photosensitive drum 27 homogeneously negatively or positively before the exposing operation, a developer unit for coating the latent image with color toners to form a toner image on the photosensitive drum 27, the developer unit including a cyan developer 29 for coating cyan toners on a latent image which has been formed on the basis of a cyan color image data, a magenta developer 30 for coating magenta toners on a latent image which has been formed on the basis of a magenta color image data and a yellow developer 31 for coating yellow toners on a latent image which has been formed on the basis of a yellow color image data, a toner supply unit including a cyan toner tank 32 for supplying the cyan toners to the cyan developer 29, a magenta toner tank 33 for supplying the magenta toners to the magenta developer 30 and a yellow toner tank 34 for supplying the yellow toners to the yellow developer 31, a cleaner 35 provided near to the photosensitive drum 27 for removing undesired toners on the photosensitive drum 27 after a transfer process, and a transfer drum 37 for transferring the toner images of cyan, magenta and yellow on the photosensitive drum 27 to a recording sheet which is supplied from a sheet supply case 36.

A color image forming operation of the digital color image copying machine 1 of this embodiment will be described hereinafter with reference to flow charts of FIGS. 4(a) and 4(b). In the embodiment, the original with the color original image formed thereon serves as the image input medium, and the reproducible range of the image input medium (input medium gamut) is determined in accordance with the kind of the image input medium (original), i.e., the kind of the image forming system utilized in the image input medium. Therefore, the gamut of the image input medium (or image input system) is changed when the kind of the original to be copied by the copying machine 1 is changed. The recording sheet serves as the image output medium, and the reproducible range of the image output medium (output medium gamut) is determined in accordance with the kind of the recording sheet and the image forming system or manner utilized in the recording portion 4 to record a color image on the recording sheet. Since the kind of the recording sheet is unchanged and the image forming system used in the recording portion 4 is also unchanged, the gamut of the image output medium (or image output system) has a fixed range.

Figure 4A:
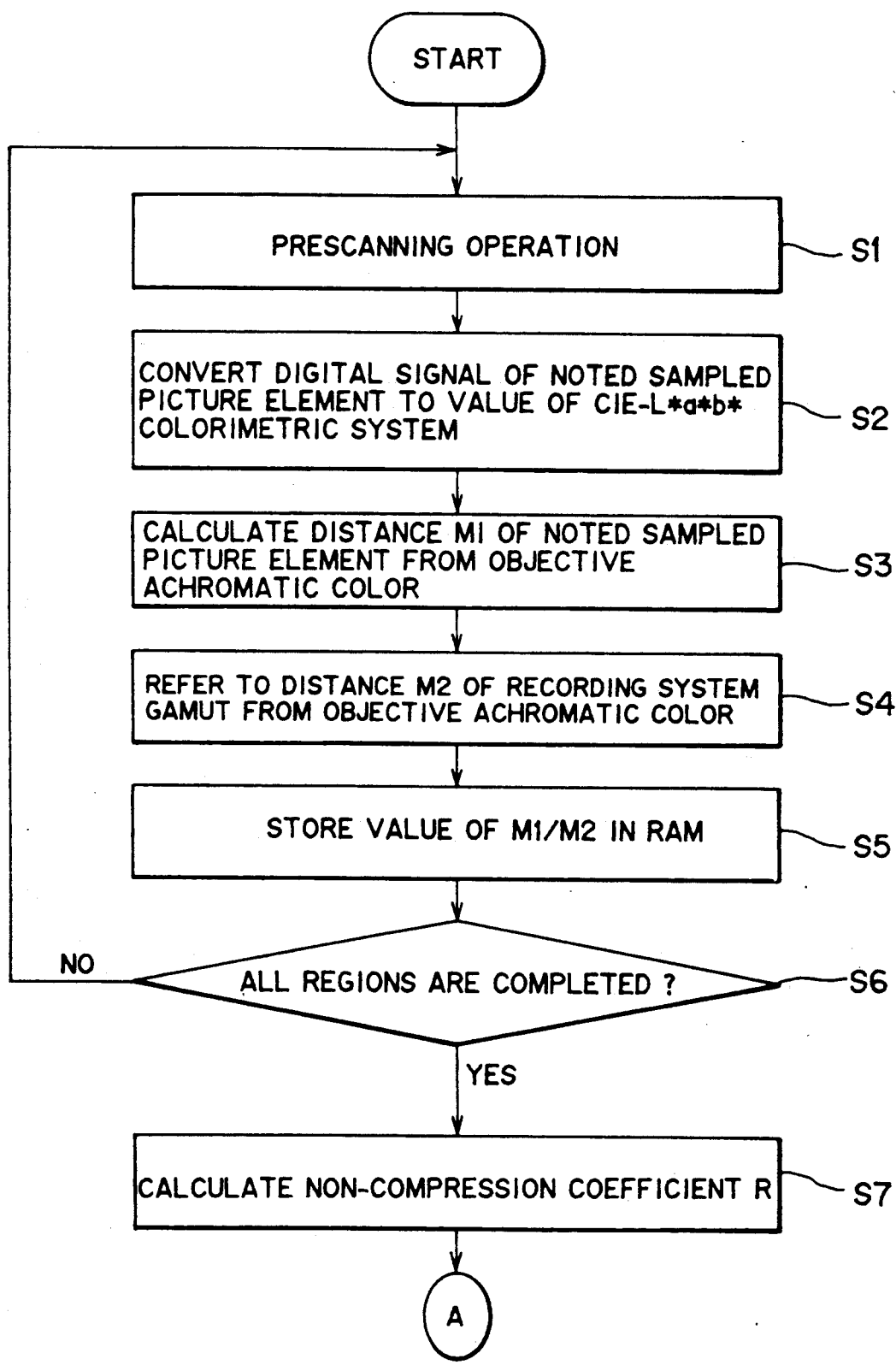
FIG. 4(a) is a flow chart for showing a process of obtaining a color distribution information of an original.
Figure 4B:
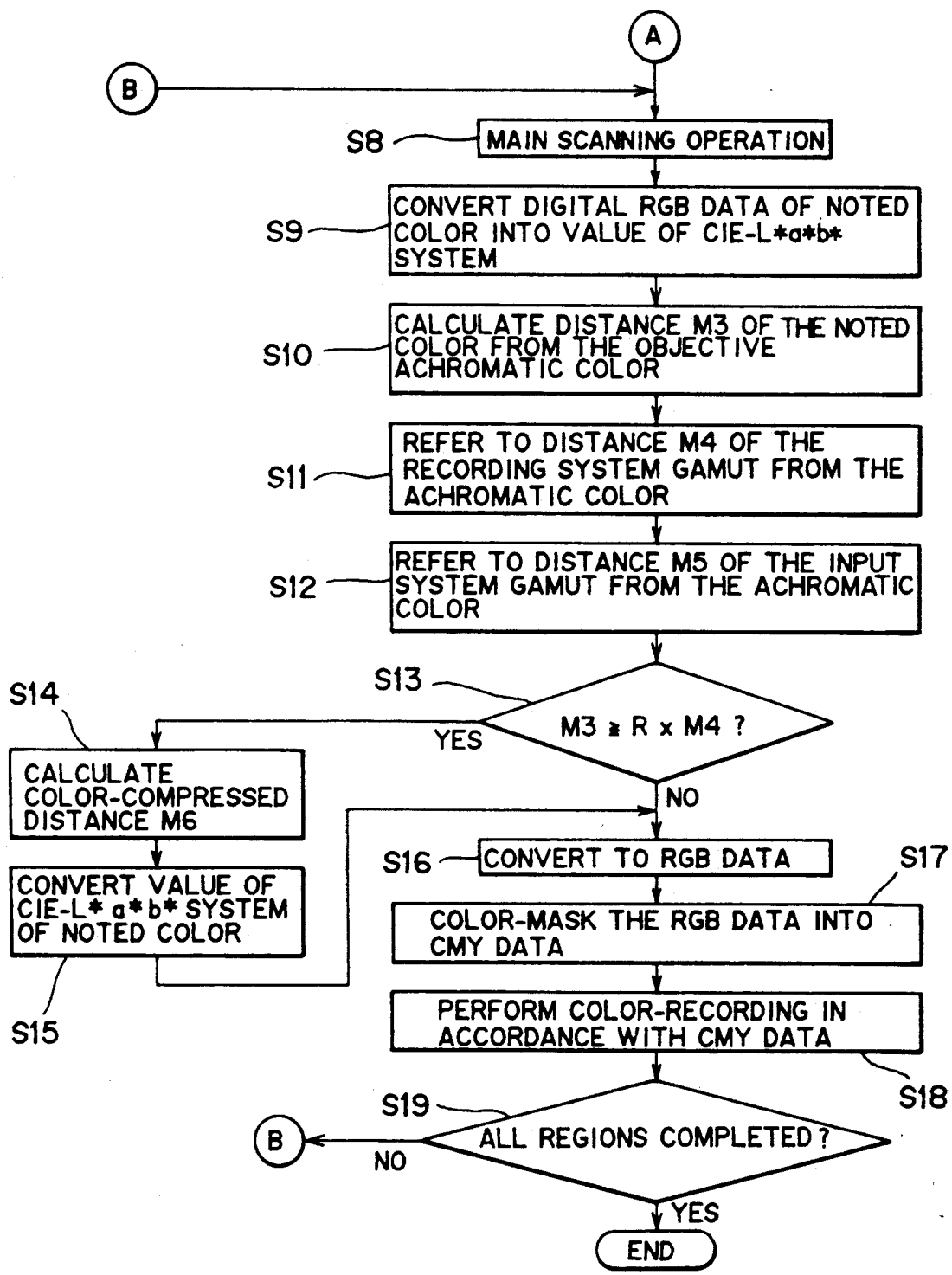
FIG. 4(b) is a flow chart for showing a process of reproducing a color image.

The image forming operation consists of: a color distribution information obtaining operation shown in FIG. 4(a) for achieving a prescanning operation to determine the color-compression parameter to be used in a color image reproducing operation; and the color image reproducing operation shown in FIG. 4(b) for achieving a main scanning operation to record a color image corresponding to a color original image with using the color-compression parameter.

First, a color original is placed on the original supply stand 14. Then, a kind of the original (image input medium) to be copied by the copying machine 1 is selected by pushing one of the original kind selecting buttons 41 to 44 on the operation panel 46, and then the copy starting button 45 is pushed.

In response to the pushing operation of the copy starting button 45, the color original placed on the original supply stand 14 is fed onto the transparent original mount 5 by the original feeding unit 16. Alternatively the color original may be directly placed on the transparent original stand 5 after opening the original cover 6. In this state, the color distribution information obtaining operation shown in FIG. 4(a) is performed as described below.

First, a prescanning operation is carried out, in step S1. In this prescanning operation, the movable stand 10 is moved by the moving unit 9 so that white light emitted from the fluorescent lamps 7 skippingly scans the color original in the auxiliary scanning direction. As a result, picture elements of the color original image are sampled skippingly along with a direction parallel to the auxiliary scanning direction. The white light emitted from the fluorescent lamps 7 is reflected at the reflection mirror 8 and passed through the lens 11 and the filter unit 12 to be received by the image pick-up element 13. The filter unit 12 consists of three primary color filters of red, green and blue colors for passing red, green and blue light components, respectively. The image pick-up element 13 is covered with the red, green and blue color filters alternately for every line extending in the main scanning direction while the movable stand 10 is moved in the auxiliary scanning direction by the moving unit 9. White light reflected from each of the sampled picture elements is therefore separated by the filter unit 12 into three primary color components, and thus obtained three color components are received by the image pickup element 13 to be converted into (analog) electrical signals.

Analog signals of the separated three color components are thus obtained by the image pickup element 13, with respect to each of the sampled picture elements. The analog signals are then transferred into the image processing portion 3 where the analog signals are converted into digital color signals by the analog-digital converter 18 and are stored in the original image storing unit (image memory) 19. As a result, three color component digital signals are obtained for each of the sampled picture elements. An RGB original color data consisting of the three color component digital signals is thus obtained for each of the sampled picture elements.

Then, a color distribution state of the color original image in a color space is speculated on the basis of the information obtained through the above-described prescanning step S1, as will be described below. (Hereinafter, a color of each sampled picture element to be subjected to the color distribution obtaining operation is referred to as "noted sampled picture element color", for simplicity and clearness of the following description.) That is, in a step S2, the RGB original color data of the noted sampled picture element is converted into a data (L*, a*, b*) of the CIE-L*, a*, b* colorimetric system. In this case, if the image reading portion 2 is satisfied with the Luther condition, an input color (RGB original color data) can be linearly converted into a data (X,Y,Z) in the CIE-XYZ colorimetric system. The data (X,Y,Z) in the CIE-XYZ colorimetric system can be converted into a data (L*, a*, b*) in the CIE-L*, a*, b* colorimetric system by the following equations (1), (2) and (3).

$$L^* = 116\,(Y/Y_n)^{\frac{1}{3}} - 16 \tag{1}$$

$$a^* = 500\,\{(X/X_n)^{\frac{1}{3}} - (Y/Y_n)^{\frac{1}{3}}\} \tag{2}$$

$$b^* = 600\,\{(Y/Y_n)^{\frac{1}{3}} - (Z/Z_n)^{\frac{1}{3}}\} \tag{3}$$

where $X_n$, $Y_n$ and $Z_n$ are three values of the CIE 1931 standard colorimetric system for a perfect diffusion surface.

Figure 5:
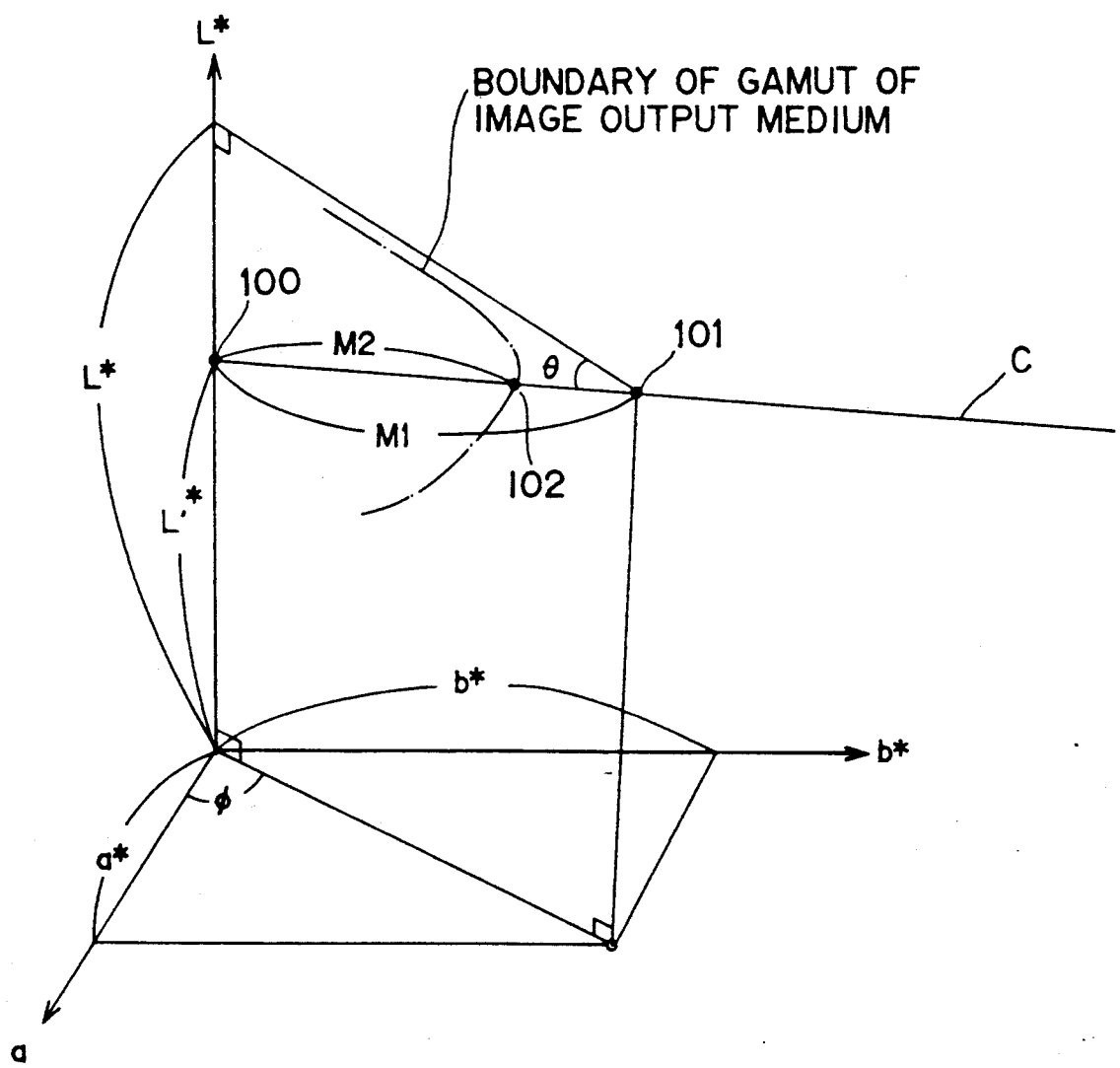
FIG. 5 is a schematic diagram for showing the manner how a non-compression coefficient R of the original image is obtained.

A coordinate of the color 101 of the noted sampled picture element 101 is determined as (L*, a*, b*) in a color space according to the CIE-L*, a*, b* colorimetric system, as shown in FIG. 5.

In a step S3, a distance M1 (color difference) from a color 101 of the noted sampled picture element to a color 100 located on the achromatic color axis and having an objective lightness L*' (which is hereinafter referred to as "an objective achromatic color") in a color space of the CIE-L*, a*, b* colorimetric system is obtained using the following equation (4), $$M1 = ((L^* = L^{*'})^2 + a^{*2} + b^{*2})^{\frac{1}{2}} \quad (4)$$

where, L*' is a L* value of the objective achromatic color in the CIE 1976 L*, a*, b* colorimetric system, and generally has a value in a range of 50 to 60. A coordinate of the objective achromatic color 100 in the color space of the CIE-L*, a*, b* colorimetric system is therefore (L*', 0, 0), as also shown in FIG. 5.

In a step S4, then, a distance M2 (color difference) from the objective achromatic color 100 to a color 102 which is positioned on a boundary of the color-reproducible range (gamut) of the image outputting (recording) medium and which has the same hue and lightness directions from the objective achromatic color as those of the noted sampled color from the objective achromatic color is obtained. That is, the image output medium gamut boundary color 102 is positioned both on a boundary of the image output gamut and on a line C which connects the noted sampled color 101 and the objective achromatic color 100, as shown in FIG. 5. The distance M2 is therefore defined as a distance between the colors 100 and 102 along the line C. Since the position of the boundary color 102 is thus determined in accordance with the position of the noted sampled color 101, the distance M2 is determined for the noted sampled color 101.

The manner of obtaining the distance M2 for the noted sampled color 101 will be described in greater detail hereinafter. The ROM 20 in the processing portion 3 stores therein a table 1. The table 1 stores therein a plurality of distance values M2' from the objective achromatic color 100 to a plurality of boundary colors which are positioned both on the boundary of the image output gamut and on a plurality of lines C extending in plural lightness and hue directions from the objective achromatic color. In the step S4, therefore, the distance M2 for the noted sampled color 101 is selected out from the plural distance values M2' stored in the table 1, in accordance with the lightness and hue directions of the line C determined by the noted sampled color 101. In other words, the distance M2 for the noted sampled color 101 is obtained by the following equations (5) to (7).

$$\theta = \arctan ((L^* - L^{*'})/(a^{*2} + b^{*2})^{\frac{1}{2}}) \quad (5)$$

$$\phi = \arctan (b^*/a^*) \quad (6)$$

$$M2 = \text{table 1} (\theta)(\phi) \quad (7)$$

where $\theta$ and $\phi$ respectively determine the lightness direction and the hue direction of the noted sampled color 101 with respect to the objective achromatic color 100 and therefore determine the lightness and hue directions of the line C, as shown in FIG. 5.

In a step S5, a ratio of M1 to M2 (M1/M2) is stored in the RAM 21. The step then proceeds to the step S6, so that the above process from the step S1 to S5 are repeated until entire part of the original is prescanned to skippingly sample the picture elements from the entire part of the original and obtain the values of M1/M2 for all the sampled picture elements. When the values of M1/M2 are thus obtained for all the sampled picture elements in step S7, a non-compression coefficient R is obtained on the basis of the values of M1/M2 for all the prescanned picture elements, using the following equation (8).

$$R = 2.0 - \sum_{i=1}^{n} (M1i/M2i)/n \quad (8)$$

where, $1.0 > R > 0$, n represents a number of prescanned or sampled picture elements and i represents each one of the picture elements. The non-compression coefficient R will serve as the color-compression parameter to be used in a color-compression operation performed in a color image reproducing operation which will be described below.

Then, the color image reproducing operation shown in FIG. 4(b) is conducted for the color image formed on the original which is still placed on the original mount 5 of the copying machine 1.

In the color image reproducing operation, a main scanning operation is first carried out in a step S8. In the main scanning operation, the fluorescent lamps 7 and so on are continuously (not skippingly) moved in the auxiliary scanning direction by the moving unit 9 for detecting all the picture elements of the original image. The white light emitted from the fluorescent lamps 7 is reflected at the original. The white light reflected from the original is further reflected at the reflection mirror 8 and passed through the lens 11 to reach the filter unit 12 where the white light is separated into three (R,G,B) primary color components. Thus separated three color components of the light reflected from the color original image are received by the solid-state image pickup element 13 to be converted into electrical signals.

Figure 6:
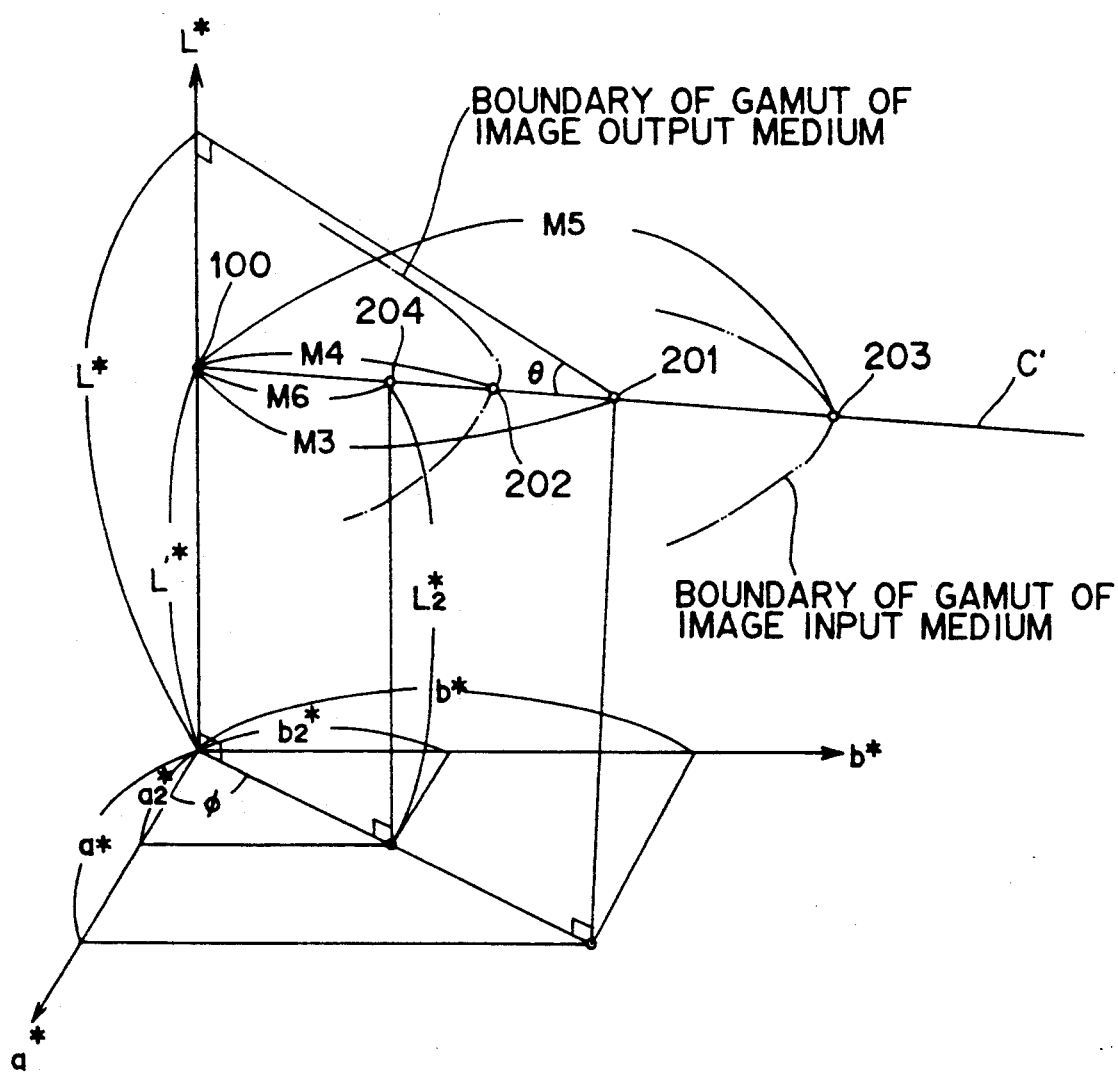
FIG. 6 shows the manner how the noted color is color-compressed in the color space.

Thus obtained analog color signals are converted into corresponding digital color signals by the analog-digital convertor 18. Thus, the original color data consisting of three primary color digital signals is obtained for each of the picture elements. The original color data thus obtained for each of the picture elements is stored in the image storing unit (image memory) 19. Each of the picture elements to be subjected to the image reproducing operation will be referred to as a "noted picture element", hereinafter. Thus stored original color data for the noted picture element is converted into a data (L*, a*, b*) in the CIE-L*, a*, b* colorimetric system in a step s9, through the already-described equations (1) to (3). Thus, the noted picture element color 201 has such a coordinate (L* a*, b*) in the color space of the CIE-L*, a*, b* colorimetric system, as shown in FIG. 6.

In a step S10, a distance M3 (color difference) from a color of the noted picture element color 201 to the objective achromatic color 100 in the space of the CIE-L*, a*, b* colorimetric system is obtained using the following equation (9), $$M3 = ((L^* - L^{*'})^2 + a^{*2} + b^{*2})^{\frac{1}{2}} \quad (9)$$

In a step S11, then, a distance M4 (color difference) from the objective achromatic color 100 to a color 202 which is at the boundary of the color-reproducible range (gamut) of the image outputting (recording) medium and which has the same hue and lightness directions from the objective achromatic color as those of the noted color from the objective achromatic color is obtained. The image output gamut boundary color 202 is positioned on a line C' connecting the noted color 201 with the objective achromatic color 100, as shown in FIG. 6. The distance M4 is therefore obtained by the following equations (10) to (12), and with reference to the table 1, similarly in the manner of obtaining the distance M2.

$$\theta = \arctan\{(L^* - L^{*\prime})/(a^{*2} + b^{*2})^{\frac{1}{2}}\} \quad (10)$$

$$\phi = \arctan(b^*/a^*) \quad (11)$$

$$M4 = \text{table 1}(\theta)(\phi) \quad (12)$$

where $\theta$ and $\phi$ respectively determine the lightness direction and the hue direction of the noted color 201 with respect to the objective achromatic color 100 and therefore determine the line C', as shown in FIG. 6.

In a step S12, a distance M5 (color difference) from the objective achromatic color 100 to a color 203 which is at the boundary of the color-reproducible range (gamut) of the image input medium and which has the same hue and lightness directions from the objective achromatic color as those of the noted color from the objective achromatic color is obtained. The image input gamut boundary color 203 is therefore positioned on the line C', as shown in FIG. 6.

The manner of obtaining the distance M5 for the noted color 201 will be described in greater detail hereinafter. The gamut of the image input medium (original) is determined in accordance with the kind of the original, as described already. The boundary of the image input gamut is therefore determined in accordance with the kind of the image input medium. In the copying machine 1, the ROM 20 in the processing portion 3 stores therein a table 2 in which various distance values M5' are stored with respect to various kinds of originals which are to be selected through the original kind selecting buttons 41 to 44 to be copies by the copying machine 1. More specifically, the table 2 stores therein various groups of distance values M5', each group corresponding to one of the kinds of originals selectable through the original kind selecting buttons. The each group of distance values M5' consists of a plurality of distance values M5' from the objective achromatic color 100 to a plurality of boundary colors which are positioned both on a boundary of the gamut of the corresponding original (image input medium) and on a plurality of lines C' extending in plural lightness and hue directions from the objective achromatic color.

In the step S12, therefore, one group of the plural groups of values M5' stored in the table 2 is first selected, in accordance with the kind of the original which has been selected by one of the original kind selecting buttons 41 to 44. Then, the distance M5 for the noted color 201 is selected out from the selected group, in accordance with the lightness and hue directions of the line C' determined by the noted color. In other words, the distance M5 for the noted color is obtained by the following equations (13) to (15).

$$\theta = \arctan\{(L^* - L^{*\prime})/(a^{*2} + b^{*2})^{\frac{1}{2}}\} \quad (13)$$

$$\phi = \arctan(b^*/a^*) \quad (14)$$

$$M5 = \text{table 2 (original kind selecting button)}(\theta)(\phi) \quad (15)$$

Next, in a step S13 it is judged whether the distance M3 of the noted color 201 from the objective achromatic color 100 is equal to or longer than a value obtained by multiplying the distance M4 by the non-compression coefficient R which has been obtained through the prescanning operation. If it is judged that the M3 is shorter than the value (R×M4), no color compression conversion is conducted on the noted color. If it is judged that the M3 is equal to or longer than the value (R×M4), the color compressing operation is conducted on the noted color to obtain a distance M6 of a color-compressed noted color 204 from the objective achromatic color 100 by the following equation (16) in a step S14.

$$M6 = M4 - (1.0 - R)M4(M5 - M3)/(M5 - R \cdot M4) \quad (16)$$

As apparent from the above description, the manner of the color-compression operation performed in the present invention is determined by the non-compression coefficient R representing the color distribution state of the original color image.

Figure 7:
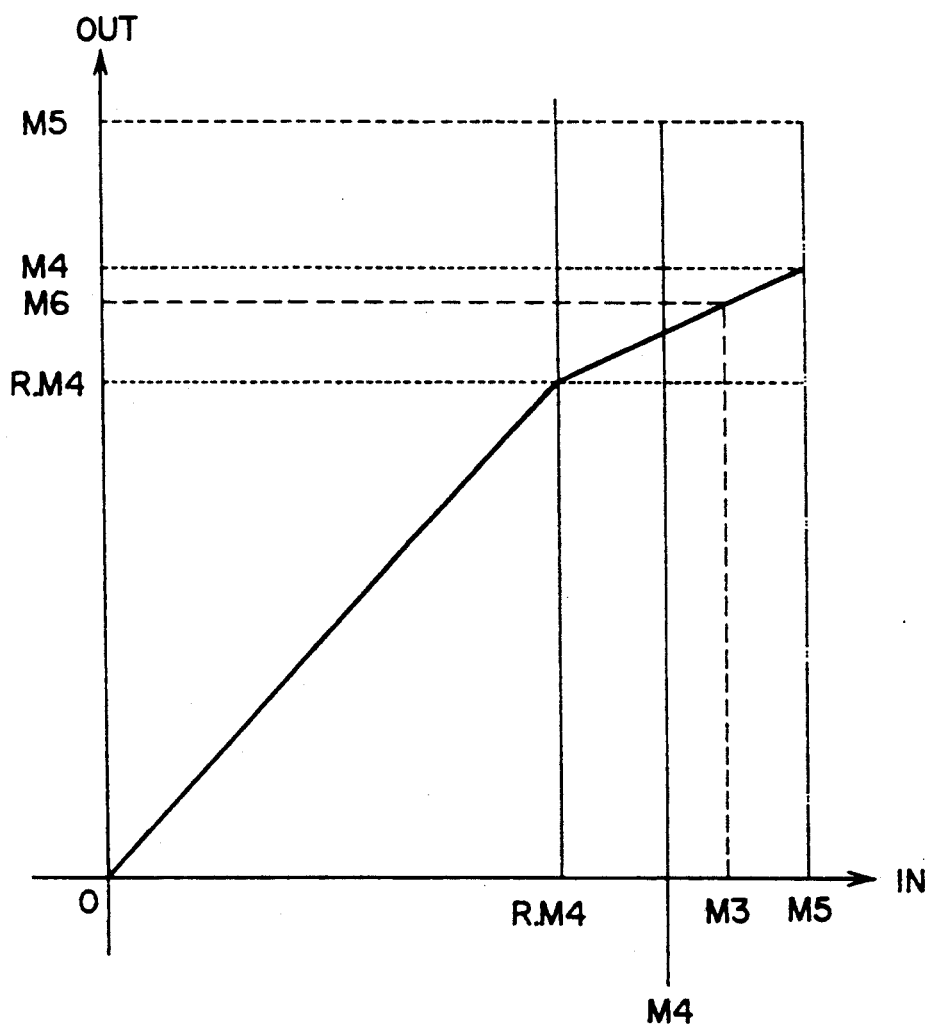
FIG. 7 is a diagram for showing a color-compression transforming of the noted color.

FIG. 7 shows the color-compression relationship among the distances M3, M4, M5 and M6. Thus, as shown in FIG. 6, in the color-compression process, the noted color 201 is shifted along the line C' toward the objective achromatic color 100 with a color-compression amount or degree M defined by the following equation, $$\begin{aligned} M &= M3 - M6 \\ &= ((L^* - L^{*\prime})^2 + a^{*2} + b^{*2})^{\frac{1}{2}} - \\ &\quad M4 + (1.0 - R)M4(M5 - M3)/(M5 - R \cdot M4). \end{aligned}$$

As a result, the color-compressed noted color 204 having the color distance M6 from the objective achromatic color 100 is obtained. As is apparent from the above equation, in the color-compression of the present invention, the color-compression degree M is determined in accordance with the non-compression coefficient R corresponding to the color distribution state of the original color image.

Thereafter, the data (L*, a*, b*) in the CIE-L*, a*, b* colorimetric system for the noted color is converted into another data ($L^*_2, a^*_2, b^*_2$) by the following equations (17) to (19) in a step S15, $$L^*_2 = \{((L^* - L^{*\prime})M6\}/M3 + L^{*\prime} \quad (17)$$

$$a^*_2 = a^* M6/M3 \quad (18)$$

$$b^*_2 = b^* M6/M3 \quad (19)$$

The data ($L_2^*, a_2^*, b-^*$) represents a coordinate of the color-compressed noted color 204, as shown in FIG. 6.

Thereafter, in a step S16, thus obtained data ($L_2^*, a_2^*, b_2^*$) is reconverted into an RGB data ($R_2, G_2, B_2$) corresponding to the RGB data (R, G, B) first obtained by the image pickup element 13. Then, a printing control data consisting of cyan, magenta and yellow color control signals for recording the noted color which is now represented by the RGB value ($R_2, G_2, B_2$) is obtained in a step S17 by the following equation (20).

$$\begin{vmatrix} C \\ M \\ Y \end{vmatrix} = \begin{vmatrix} a11 & a21 & a31 \\ a12 & a22 & a32 \\ a13 & a23 & a33 \end{vmatrix} \cdot \begin{vmatrix} R \\ G \\ B \end{vmatrix} \quad (20)$$

where R, G and B are red, green and blue digital color signals constituting the color-compressed RBG color data ($R_2$, $G_2$, $B_2$), C, M and Y are cyan, magenta and yellow printing control signals constituting the printing control data, and aij are color-proofing coefficients. The color-proofing operation using the equation (20) is called a "color-masking operation".

Through the color-proofing operation, the RGB data ($R_2$, $G_2$, $B_2$) represented by RGB colorimetric system is converted into CMY data (C, M, Y) represented by CMY colorimetric system which is different from the RGB colorimetric system.

The cyan, magenta and yellow color control signals of the printing control data are respectively transmitted to the laser control unit 24, and a laser light is emitted in accordance with each of the color control signals. The laser light is reflected from the polygon mirror 25, and then irradiated to the photosensitive drum 27 which has been homogeneously charged by the charger 28, thereby forming a latent image on the photosensitive drum 27.

The latent image on the photosensitive drum 27 is supplied with toners from one of the cyan, magenta and yellow developers 29, 30 and 31 in accordance with the cyan, magenta and yellow color signals of the printing control data to thereby develop the latent image into a toner image. A recording sheet which has been supplied from the sheet supply case 36 is wound around the transfer drum 37, and then the developed toner image is transferred from the photosensitive drum 27 to the recording sheet. The recording sheet which has been subjected to the transfer operation is thermally fixed by the heat-fixing unit 38 on a way of a sheet feeding operation of the sheet feed unit 40, and discharged out to the outlet tray 39. On the other hand, residual toners on the photosensitive drum 27 are removed by the cleaner 35.

A manner of determining values most suitable for the color-proofing coefficients aij used in the color masking equation (20) will be described hereinafter.

Assume that a printing control data controls the recording portion 4 of the copying machine 1 to record a corresponding color on the image output medium. The printing control data consists of three (cyan, magenta and yellow) printing control signals Tjk (j=C, M and Y). Then, n number of the printing control data are assumed for n number of colors to be recorded by the recording portion 4. That is, the printing control signals Tjk (j=C, M and Y; k=1 through n) are assumed. In order to determine the most suitable values for the coefficients aij, since the number of the values aij in the matrix of the equation (20) is nine, the assumed number of the colors n is required to be much more than the number nine.

The n number of printing control signals Tjk are transferred to the laser control unit 24. The recording portion 4 records a color image on the image output medium (recording sheet), in accordance with the printing control signals Tjk. The color image thus recorded on the recording sheet consists of the n number of colors represented by the printing control signals Tjk.

The recording sheet with the color image thus recorded thereon is then placed on the original mount 5 so that the color image on the recording sheet is read out by the reading portion 2. A color data consisting of three primary color component digital signals Xik (i=R, G and B) is obtained for each of the colors represented by the printing data consisting of the three printing control signals Tjk (j=C, M and Y). Thus, n number of the color data are obtained corresponding to the n number of the printing control data. In other words, the primary color component digital signals Xik (i=R, G and B; k=1 through n) are obtained in correspondence with the printing control signals Tjk (j=C, M and Y; k=1 through n).

Assume that the primary color component digital signals Xik and the printing control signals Tjk have such a relationship therebetween as determined by the following equation (21);

$$Tjk \approx \sum_{i=1}^{3} aij\, Xik \qquad (21)$$

Values of the coefficients aij satisfying the formula (21) will provide the values most suitable for the color-proofing coefficients aij of the matrix of the equation (20).

In order to obtain the values of the coefficients aij satisfying the formula (21), values ejk are defined by the following equation (22);

$$ejk = Tjk - \sum_{i=1}^{i=3} aij\, Xik \qquad (22)$$

Values Fj are further defined by the following equation (23);

$$Fj = \sum_{k=1}^{k=n} ejk^2 = \sum_{k=1}^{k=n}\left( Tjk - \sum_{i=1}^{i=3} aij\, Xik \right)^2 \qquad (23)$$

Values of the coefficients aij obtained in the case where the value Fj of the equation (23) becomes the minimum satisfies the formula (21). In the case where the value Fj in the equation (23) becomes the minimum, a value obtained by partially differentiating the value Fj with aij becomes zero (0), as indicated by the following equation (24);

$$\Delta Fj/\Delta aij = -2 \sum_{k=1}^{k=n}\left[\left( Tjk - \sum_{i=1}^{i=3} aij\, Xik \right) Xik \right] \qquad (24)$$
$$= 0$$

The following equation (25) is further obtained from the equation (24);

$$\sum_{k=1}^{k=n} Tjk\, Xik = \sum_{k=1}^{k=n} \sum_{i=1}^{i=3} aij\, Xik\, Xik \qquad (25)$$

As a result, the following equation (26) is obtained, $$\sum_{k=1}^{k=n} Tjk\, Xik = \sum_{i=1}^{i=3}\left( aij \left(\sum_{k=1}^{k=n} Xik\, Xik\right)\right) \qquad (26)$$

The values most suitable for the aij of the matrix of the equation (20) is obtained by solving the simultaneous linear equations (26).

As described above, according to the image forming apparatus of the first embodiment of the present invention, the color original image is prescanned to obtain the color distribution information of the color original image. The color information signals of the color original image are subjected to the color-compression operation with such a color-compression degree as suitable for the color distribution information of the color original image. Therefore, it becomes possible to properly color-compress the colors of the original image, irrespective of color distribution of the original image, and therefore to reproduce the color original image with sufficient reproducibility.

Figure 8:
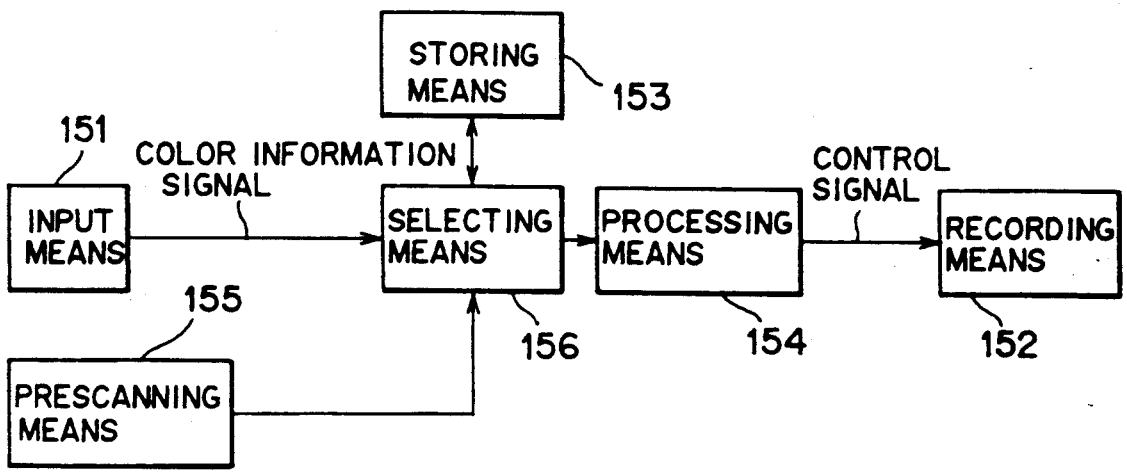
FIG. 8 is a block diagram of a second embodiment of the image forming apparatus of this invention.

FIG. 8 shows a second embodiment of the color image recording apparatus of the present invention.

The color image recording apparatus of this embodiment includes an input means 151 for obtaining an original color information signal corresponding to a color of a color original image; a recording means 152 for carrying out a color recording process using at least three coloring materials of cyan, magenta and yellow; storing means 153 for storing plural combination data each consisting of both plural colors to be obtained by the input means 151 and corresponding control signals for actuating and controlling the recording means 152 to record the colors, the plural combination data being determined with respect to color distribution information of color original images; pre-scanning means 155 for preliminarily scanning (pre-scanning) the color original prior to a main scanning operation to thereby obtain the color distribution information of the color original image; a selecting means 156 for selecting a desired combination data from the plural combination data stored in the storing means 153 in accordance with the color distribution information obtained by the pre-scanning means 155; and color processing means 154 for obtaining, on the basis of the desired combination data, a suitable control signal for controlling the recording means 152 to record a color substantially the same as that of the original color information signal.

Each of the plural combination data stored in the storing means 153 consists of both plural color information signals to be obtained by the input means 151 and control signals for controlling the recording means 152 to record colors the same as those represented by the color information signals, the control signals being obtained by color-compressing the plural color information signals in achromatic directions in such various types of manners or with such various degrees as determined in accordance with color distribution information of color original images to be reproduced by the image recording apparatus.

In the image recording apparatus thus constructed, the color original is first roughly scanned by the pre-scanning means 155 to obtain the color distribution information of the color original image. Then, the input means 151 obtains original color information signals for all the picture elements of the color original image. In accordance with the obtained color distribution information of the color original image, a desired combination data of both the plural color information signals and the corresponding control signals are selected by the selecting means 156 from the plural combination data stored in the storing means 152. In other words, plural combinations of color information signals and corresponding control signals in the desired combination data are selected for each of the original color information signals. On the basis of the plural combinations of color information signals and corresponding control signals, there is obtained, through interpolating operation, etc., a control signal for controlling the recording means 152 to record a color corresponding to each of the original color information signals. The recording means 152 carries out its recording operation using cyan, magenta and yellow inks or toners in accordance with the obtained control signals, to reproduce the color original image.

In the image forming apparatus of the first embodiment, colors actually reproduced on the original (image input medium) are one by one subjected to the color-compression process and the color-proofing process, and printing control signal data corresponding to the original colors are produced to be used for forming an image corresponding to the original image. On the other hand, according to the image forming apparatus of the second embodiment, a plurality of colors representing a color space reproducible on the image input medium are beforehand subjected to the color-compression processing with respect to various values of the non-compression coefficients R. Then, thus obtained color-compressed data for the various values of the non-compression coefficient R are color-proofed, to thereby obtain printing control signal data corresponding to the colors. A plurality of combination data each consisting of the colors and the corresponding control signals with respect to the corresponding non-compression coefficient R are stored in a storing means. When an image formed actually on one original (image input medium) is to be reproduced by the image forming apparatus, the non-compression coefficient R of the original image is first calculated through the prescanning operation. Then, one combination data is selected out from the plurality of combination data stored in the storing means, in accordance with the calculated non-compression coefficient R. After that, the original is subjected to the main scanning operation so that all the colors actually reproduced on the original are read out. For each of the original colors, several numbers of the control signals are selected from the one combination data which has been selected in accordance with the non-compression coefficient R. Then, interpolating processing is carried out for the several numbers of control signals to thereby obtain a control signal for controlling the recording means to record a color the same as the each original color. Based on thus obtained control signals, the original image is reproduced.

Constructions of a copying machine 1 to which the image forming apparatus of the second embodiment is applied are substantially the same as those of that of the first embodiment as shown in FIGS. 2(a), 2(b) and 3, except for an operation of the color image processing portion 3. In other words, the color image processing portion 3 serves as the storing means 153, the color processing means 154, the selecting means 156 and the prescanning means 155. The ROM 20 stores therein a plurality of groups of combination data, each group consisting of a plurality of colors and corresponding control signal data, as will be described later. The original color image reading portion 2 and the color image recording portion 4 shown in FIG. 2 serves as the input means 151 and the recording means 152 as in the first embodiment.

The description of the same elements or functions with the first embodiment are therefore eliminated from the following description.

In the second embodiment, a three-dimensional color space is defined as being constructed by three R, G and B axes extending perpendicularly to one another. In the color space, an arbitrary color point (R, G, B) represents an arbitrary color inputtable to the color image processing portion 3 from the image input medium (original) through the image reading portion 2. The three dimensional axes are uniformly divided to thereby uniformly divide the color space into three-dimensional color lattice space.

With respect to colors located at all the lattice points in the lattice color space, the color-compression operation and the color-proofing operation as described in the first embodiment with reference to FIG. 4(b) are performed with using various values of the non-compression coefficients R and with using gamuts of various image input media or originals selectable through the original kind selecting buttons 41 through 44. As to the non-compression coefficient R, various values are selected. For example, values of 0.0, 0.2, 0.4, 0.6, 0.8 and 1.0 are selected for the non-compression coefficient R.

The manner of color-compressing and color-proofing all the lattice point colors with respect to the selected non-compression coefficients R and with respect to the image input gamuts selectable by the selecting buttons 41 to 44 will be described in greater detail hereinafter.

First, using one value (for example, 0.0) of the selected various non-compression coefficient values R, all the lattice point colors are one by one subjected to color-compression operation (the steps S9 through S16 shown in FIG. 4(b)) with using one image input gamut (for example, photographic film gamut) for the calculation of the color distance M5. As a result, color data are obtained for all the lattice point colors. The color data are then subjected to the color-proofing operation (the step S17 shown in FIG. 4(b)), as a result of which printing control data consisting of three (C, M and Y) printing control signals are obtained for the colors located at all the lattice points. A combination data consisting of each of all the lattice point colors and the corresponding printing control data is obtained, with respect to the used non-compression coefficient value R (0.0) and the image input gamut (photographic film gamut).

Then, with the non-compression coefficient value R being fixed to be maintained (to be 0.0), all the lattice point colors are again one by one subjected to color compression operation with using another image input gamut (for example, printed sheet gamut) for the calculation of the color distance M5, and subjected to color-proofing operation to obtain printing control data for all the lattice point colors.

The color-compression and color-proofing operation for all the lattice point colors are thus conducted with using each one of the image input gamuts selectable by the selecting buttons 41 through 44, with respect to the one value (0.0) of the selected various non-compression coefficient values R.

Then, with respect to another one (for example, 0.2) of the selected non-compression coefficient values R, the above-described color-compression and color proofing operations for all the lattice point colors are again conducted with using all the image input gamuts selectable by the selecting buttons. In other words, with respect to the another value (0.2) of the non-compression compression coefficients R, the above-described operation conducted for the value (0.0) of the non-compression coefficient R are conducted.

Thus, with respect to each one of the selected non-compression coefficient values R (0.0 through 1.0), the above-described color-compression and color-proofing operations for all the lattice color points are conducted, with using all the image input gamuts selectable by the selecting buttons.

A combination data consisting of each of all the lattice point colors and the corresponding printing control data is thus obtained for each of the image input gamuts selectable by the selecting buttons 41 through 44 and for each of the selected values of the non-compression coefficients R. Thus, there is obtained a group of combination data which is composed of combination data of all the lattice point colors and the corresponding printing control data with respect to corresponding one of the selectable image input gamuts and with respect to corresponding one of the selected values of the non-compression coefficients R. A plurality of groups of combination data for the plural different values of the non-compression coefficient R and plural different gamuts of the image input media are obtained and stored as a look-up table in the ROM 20 in the image processing portion 3 shown in FIG. 3. The number of the groups of combination data stored in the ROM 20 is therefore equal to the number obtained by multiplying the number (six, in this case) of the selected non-compression coefficient values R (0.0, 0.2, 0.4, 0.6, 0.8 and 1.0) by the number of the image input media selectable by the selecting buttons 41 through 44.

The above-described operations of calculating the printing control data and storing the combination data representing the relationships between the lattice point colors and the printing control data are conducted while the copying machine 1 is being manufactured before being sold. Such the operations may be conducted after the copying machine is sold but immediately before an operator actuates the copying machine to perform the copying operation.

The color copying operation of the copying machine of the second embodiment is conducted as will be described hereinafter.

Figure 9:
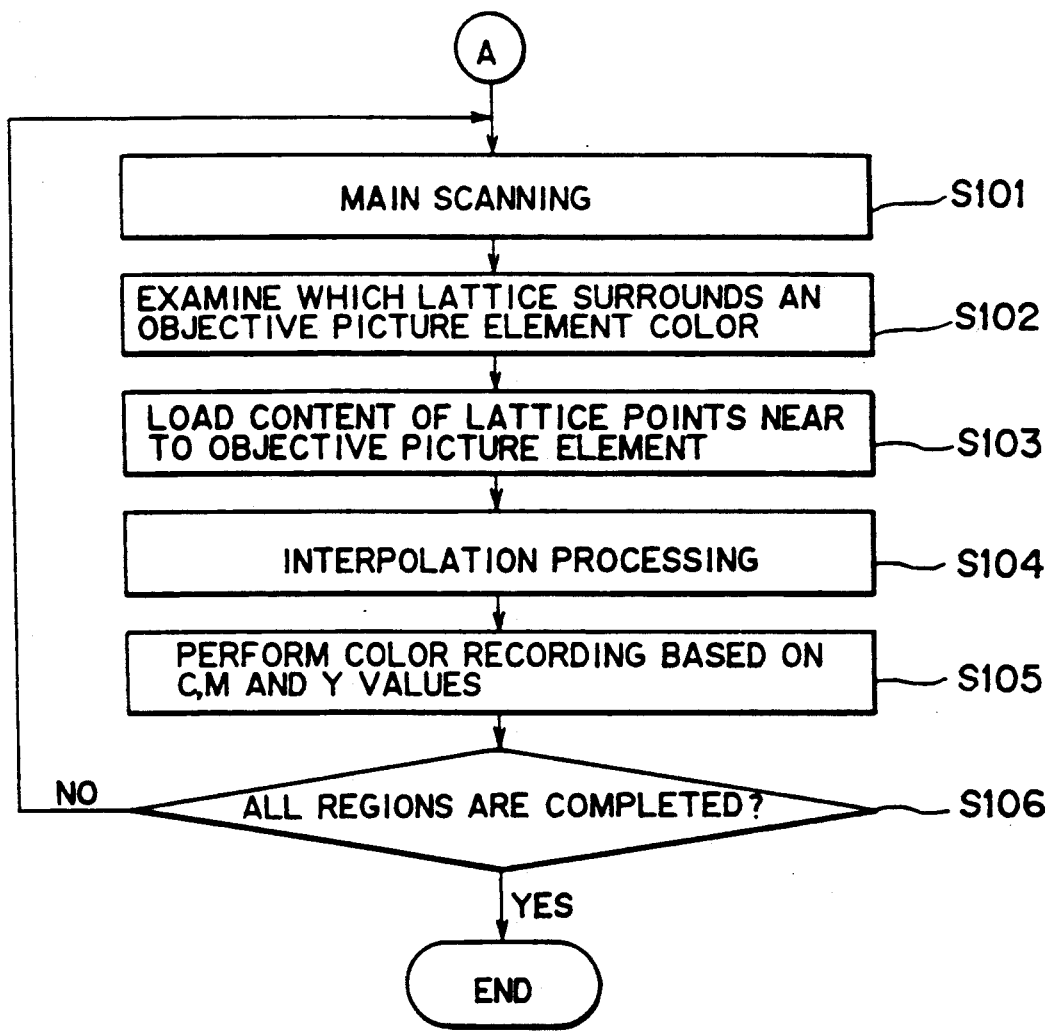
FIG. 9 is a flowchart for showing a color image reproducing process using an interpolative processing in the second embodiment.

The color copying operation consists of the color distribution information obtaining operation shown in FIG. 4(a) for achieving the prescanning operation to determine the non-compression coefficient R of the original image and a color image reproducing operation shown in FIG. 9 for achieving a main scanning operation to record a color image corresponding to the color original image with using the non-compression coefficient R. The color distribution information obtaining operation achieved in the second embodiment is the same as that in the first embodiment. The color image reproducing operation shown in FIG. 9 is different from that in the first embodiment shown in FIG. 4(b).

After when a color original is placed on the original mount 5, one of the original kind selecting buttons 41 through 44 corresponding to the kind of the color original is selected to be pushed. Then, the copy starting button 45 is pushed, and the color distribution information obtaining operation, i.e., the steps S1 through S7 shown in FIG. 4(a) are conducted, so that the non-compression coefficient R for the color original image formed on the original is obtained. In accordance with thus calculated non-compression coefficient R and the kind of the original selected by one of the original kind selecting buttons, one group of the combination data is selected from the plural groups of the combination data stored in the ROM 20. In other words, it is judged which one of the image input media utilized to calculate the plural groups of the combination data is the same as the kind of the original selected through the original kind selecting button. It is further judged which one of the non-compression coefficient values R utilized to calculate the plural groups of the combination data is equal to the non-compression coefficient data R of the color original image obtained through the above-described color distribution information obtaining process. Then, one group of the combination data corresponding to the non-compression coefficient data R of the original color image and the kind of the original is selected from the plural groups stored in the ROM 20. The one selected group of the combination data is composed of all the lattice point colors and the corresponding printing control data obtained with respect to the non-compression coefficient R of the original image and with respect to the selected kind of the original.

Then, the color image reproducing operation shown in FIG. 9 is achieved. First, the main scanning operation is conducted in the step S101. In the main scanning operation, similarly in the step S8 shown in FIG. 4(b) in the first embodiment, an entire surface of the color original on the original mount 5 is scanned by the white light from the light sources 7, so that the original color data consisting of three color component digital signals R, G and B are obtained for all the picture elements of the color original. The manner of obtaining the digital original color data is the same as that conducted in the first embodiment.

Since each of the original color data is represented by a three-dimensional (R, G and B) color point in the RGB color space, it is judged in the step S102 which lattice of the color lattice space includes the color point of the each original color data. (The color of the original color data to be subjected to the image reproducing operation is referred to as "objective color" hereinafter.) In other words, it is judged which colors located at lattice points surround the objective color. Then, in step S103, the printing control data corresponding to the lattice point colors surrounding the objective color are read out from the selected group of combination data consisting of all the lattice point colors and the corresponding printing control data. The number of the lattice point colors surrounding the objective color is eight.

In a step S104, interpolative processing is carried out for thus read out printing control data, using the following equation to obtain a printing control data consisting of three control signals C, M and Y for the objective color.

$$Di = \left( \sum_{j=1}^{8} (Mj \times Lij) \right) / \sum_{j=1}^{8} Mj$$

where Lij (i=C, M, Y; j represents each one of the eight lattice point colors surrounding the objective color) represents a printing control signal for the color located at the lattice point, Mj represents a volume of a rectangular parallelpiped lattice space which includes diagonal lattice points and the objective color, and Di represents a control signal for the objective color.

The printing control data consisting of the three (C, M and Y) control signals are thus obtained for the colors of all the picture elements of the original image, and are transmitted to the laser control unit 24, so that an image corresponding to the original image is formed on the recording sheet in steps S105 and S106, similarly as in the first embodiment.

As described above, according to the image forming apparatus of the second embodiment of the present invention, the color original image is prescanned to obtain the color distribution information of the color original image. Printing control signals for controlling the recording portion to record the color original image are obtained on the basis of data obtained by color-compressing color information with such a color-compression degree as suitable for the color distribution information of the color original image. Therefore, it becomes possible to properly color-correct the colors of the original image, irrespective of color distribution of the original image, and therefore to reproduce the color original image with sufficient reproducibility.

As described above, according to the image forming apparatus of the present invention, the color original image is prescanned to speculate the color distribution of the color original image, to thereby obtain printing control signals obtained through color-compression processing using a color compression coefficient suitable for the color distribution state. Therefore, a suitable color processing is constantly carried out irrespective of color distribution state of the original image, and the original color image can be recorded or reproduced with excellent color reproducibility.

This invention is not limited to the above embodiments. Many modifications may be made to the above embodiments without departing from the subject matter of this invention. For example, the parameter representing a color distribution information of a color original image is not limited to the non-compression coefficient R determined by the equation (8). The parameter may represent the color distribution state of the color original image.

In the above-described embodiments, the color-compression processing is not performed to a color, in the case where a color distance of the color from the objective achromatic color is shorter than a value which is obtained by multiplying the non-compression coefficient R by a color distance of an output gamut boundary color from the objective achromatic color. However, in such a case, the color may be subjected to such a color-compression processing with its compression degree or amount M being zero (0).

Furthermore, a manner of obtaining the combination data of colors and corresponding control signals in the second embodiment is not limited to the above manner. The original kind selecting buttons 41 through 44 are provided on the copying machine of the above embodiments. However, the original kind selecting buttons may be eliminated from the copying machine. In this case, only a single gamut is determined as the image input gamut. Therefore, the table 2 used in the first embodiment may store therein the distance values M5' for only the single image input gamut. Similarly, also in the second embodiment, a plurality of groups of combination data may be calculated to be stored in the ROM 20, only with respect to the plural different values of the non-compression coefficient R. In this case, therefore the number of the groups of combination data stored in the ROM 20 is equal to the number of the selected non-compression coefficients R. One group of the plural groups is selected from the plural groups, only in accordance with the non-compression coefficient data R obtained through the color distribution information obtaining process.

The above embodiments are described representatively in a digital color copying machine, however, this invention may be applied to a color printer without a color original reading portion. Still further, the above embodiments adopt cyan, magenta and yellow color recording process, however, a black color may be added to these three colors to perform the color recording process.

I claim:

1. A color image forming apparatus for obtaining a color image data representing each color of an original color image formed on an image input medium and forming on an image output medium a color image corresponding to the original color image, the image input medium and the image output medium having first and second gamuts, respectively, the first and second gamuts being defined as reproducible ranges of the image input medium and the image output medium, said color image forming apparatus comprising:

image input means for inputting a color image data representative of a color of each picture element of the original color image, the color of the each picture element thus represented by the color image data being positioned inside of the first gamut;

color distribution detecting means for detecting color distribution of the original color image to generate color distribution information of the original color image;

control signal producing means for producing a control signal on the basis of the color image data, the control signal having a value corresponding to that obtained through selectively transforming the color image data in a color-compression transformation which is determined on the basis of the color distribution information of the original color image, so that a color represented by the control signal corresponding to the color of each picture element of the original color image is positioned inside of the second gamut; and image recording means for recording, on the basis of the control signal, the color represented by the control signal on the image output medium as a color image corresponding to the original color image.

2. The color image forming apparatus as claimed in claim 1, wherein the color distribution information of the original color image includes information of the color image data of the color of at least one picture element of the original color image with respect to the second gamut.

3. The color image forming apparatus as claimed in claim 2, wherein the color distribution information of the original color image includes information of a ratio of a first color difference between a predetermined objective achromatic color and a color of at least one picture element of the original color image with respect to a second color difference between the objective achromatic color and a boundary color of the second gamut.

4. The color image forming apparatus as claimed in claim 3, wherein said color distribution detecting means includes prescanning means for prescanning the original color image to sample a color image data of at least a picture element of the original color image to thereby calculate the first color difference.

5. The color image forming apparatus as claimed in claim 1, wherein said control signal producing means includes:

color-compression means for selectively color-compressing a color represented by the color image data in such a manner that the color-compression means may color-compress at least such a color image data as having a color-distribution-dependent relationship with the second gamut, the color-distribution-dependent relationship being determined on the basis of the color distribution information of the original color image to thereby produce a replacing color image data; and calculation means for calculating the control signal based on one of the non-selected color image data and the replacing color image data.

6. The color image forming apparatus as claimed in claim 5, wherein said color-compression means selectively color-compresses the color represented by the color image data with a color-compression degree which is determined on the basis of the color distribution information of the original color image to thereby produce the replacing color image data.

7. The color image forming apparatus as claimed in claim 6, wherein the color distribution information of the original color image includes information of the color image data of at least one picture element of the original color image with respect to the second gamut.

8. The color image forming apparatus as claimed in claim 7, wherein said color distribution detecting means calculates a ratio of a first color difference M1 between a predetermined objective achromatic color and a color of at least one picture element of the original color image with respect to a second difference M2 between the objective achromatic color and a boundary color of the second gamut to thereby obtain a non-compression coefficient R defined by the following equation, $$R = 2.0 - \sum_{i=1}^{n} (M1i/M2i)/n$$

where n represents the number of the at least one picture elements and i represents each one of the at least one picture elements.

9. The color image forming apparatus as claimed in claim 8, wherein said color distribution detecting means includes prescanning means for prescanning the original color image to sample a color image data of at least a picture element of the original color image to thereby calculate the first color difference M1.

10. The color image forming apparatus as claimed in claim 9, wherein said color-compression means selectively shifts the color represented by the color image data in a direction toward the objective achromatic color to produce the replacing color image data in such a manner that said color-compression means may color-compress at least such a color image data as having a color-difference from the objective achromatic color equal to or larger than a value obtained by multiplying the second color difference M2 by the non-compression coefficient R of the original color image.

11. The color image forming apparatus as claimed in claim 10, wherein said color-compression means selectively shifts the color represented by the color image data in a the direction toward the objective achromatic color with a color-compression degree which is determined in accordance with the non-compression coefficient R of the original color image.

12. The color image forming apparatus as claimed in claim 5, wherein the calculation means of said control signal producing means further includes color-proofing means for transforming one of the non-selected color image data and the replacing color image data into the control signal.

13. The color image forming apparatus as claimed in claim 1, wherein said control signal producing means includes:

storing means for storing plural groups of combination data, each group of the combination data consisting of a plurality of color data inputtable by said input means and a plurality of record signals for controlling said image recording means to record, on the image output medium, colors corresponding to colors represented by the respective color data, the colors represented by the color data being positioned inside of the first gamut and the colors represented by the record signals being positioned in the second gamut, the plural groups of the combination data corresponding to plural color distribution data generatable by said color distribution detecting means, respectively, each of the record signals of each of the groups of the combination data being obtained through selectively transforming the corresponding color data in a color-compression transformation determined on the basis of the corresponding color distribution data; and selecting means for selecting one group of the plural groups of combination data in accordance with the color distribution information of the original color image generated by said color distribution detecting means to thereby produce the control signal.

14. The color image forming apparatus as claimed in claim 13, wherein said selecting means includes judging means for judging which one of the plural color distribution data is equal to the color distribution information generated by said color distribution detecting means.

15. The color image forming apparatus as claimed in claim 14, wherein the selecting means of said control signal producing means includes means for calculating the control signal through an interpolative process on the basis of at least two record signals of the selected one group of combination data.

16. The color image forming apparatus as claimed in claim 15, wherein each of the record signals of each of the groups of the combination data is calculated through selectively color-compressing each of the plurality of color data in such a manner that at least such color data as having a color-distribution-dependent relationship with the second gamut may be color-compressed, the color-distribution-dependent relationship being determined dependently on the corresponding color distribution data, to generate a replacing color data and through calculating each record signal based on one of the non-selected color data and the replacing color data.

17. The color image forming apparatus as claimed in claim 16, wherein the record signals of each of the groups of the combination data are calculated through selectively color-compressing the color data with a color-compression degree, which is determined on the basis of the corresponding color distribution data, to generate the replacing color data.

18. A color image forming apparatus for obtaining a color image data representing each color of an original color image formed on an image input medium and forming on an image output medium a color image corresponding to the original color image, the image input medium having a first gamut and the image output medium having a second gamut, the first and second gamuts being defined as reproducible ranges of the image input medium and the image output medium, respectively, said color image forming apparatus comprising:

image input means for inputting a color image data of a color of each picture element of the original color image, the color represented by the color image data being positioned inside of the first gamut;

color distribution detecting means for detecting color distribution of the original color image to generate color distribution information of the original color image;

color-compression parameter calculating means for calculating a color-compression parameter on the basis of the color distribution information of the original color image;

color-compression means for selectively color-compressing the color image data by using the color-compression parameter to produce a replacing color image data in such a manner that said color-compression means may color-compress such a color image data as having a color-compression-parameter-dependent relationship with the second gamut, the color-compression-parameter-dependent relationship being determined on the basis of the color-compression parameter;

color proofing means for color-proofing the color image data in the case where said color-compression means does not color-compress the color image data and for color-proofing the replacing color image data in the case where said color-compression means color-compresses the color image data to produce the replacing color image data, to thereby produce a control signal, the control signal representing color which corresponds to the color represented by the color image data and which is positioned inside of the second gamut; and image recording means for recording, on the basis of the control signal, the color represented by the control signal on the image output medium, to thereby record a color image corresponding to the original color image on the image output medium.

19. The color image forming apparatus as claimed in claim 18, wherein said color-compression means selectively color-compresses the color represented by the color image data with a color-compression degree, which is determined on the basis of the color-compression parameter of the original color image, to thereby produce the replacing color image data.

20. A color image forming apparatus for obtaining a color image data representing each color of an original color image formed on an image input medium and forming on an image output medium a color image corresponding to the original color image, the image input medium having a first gamut and the image output medium having a second gamut, the first and second gamuts being defined as reproducible ranges of the image input medium and the image output medium, said color image forming apparatus comprising:

image input means for inputting a color image data of color of each picture element of the original color image, the color represented by the color image data being positioned inside of the first gamut;

color distribution detecting means for detecting color distribution of the original color image to generate color distribution information of the original color image;

storing means for storing plural groups of combination data, each group consisting of plural color data to be inputtable by said image input means and record signals to control recording means to record colors corresponding to the color data, colors represented by the color data being positioned inside of the first gamut and colors represented by the record signals being positioned in the second gamut, the plural groups of combination data being calculated with respect to plural color distribution data generatable by said color distribution detecting means, each of the record signals in each of the plural groups of combination data being calculated through selectively color-compressing the corresponding color data in such a manner as determined on the basis of the corresponding color distribution data;

selecting means for selecting one of the plural groups of combination data in accordance with the color distribution information generated by said color distribution detecting means;

color processing means for processing at least one record signal of the selected one group of combination data to thereby produce a control signal, the control signal representing color which corresponds to the color represented by the color image data and which is positioned inside of the second gamut; and image recording means for recording, on the basis of the control signal, the color represented by the control signal on the image output medium, to thereby record on the image output medium a color image corresponding to the original color image.

21. The color image forming apparatus as claimed in claim 20, wherein said color processing means interpolatively calculates the control signal based on at least two record signals of the selected one group of combination data.

22. The color image forming apparatus as claimed in claim 19, wherein each of the record signals of each of the plural groups of the combination data is calculated through selectively color-compressing each of the plurality of color data in such a manner that such a color data as having a color-distribution-dependent relationship with the second gamut may be color-compressed into a replacing color data, the color-distribution-dependent relationship being determined on the basis of the corresponding color distribution data and through calculating the record signal based on the color data in the case where the color data is not color-compressed and calculating the record signal based on the replacing color data in the case where the color data is color-compressed into the replacing color data.

23. The color image forming apparatus as claimed in claim 22, wherein the record signals of each of the groups of the combination data are calculated through selectively color-compressing the color data with a color-compression degree, which is determined on the basis of the corresponding color distribution data, to generate the replacing color data.

24. The color image forming apparatus for obtaining a color image data, representing each color of an original color image formed on an image input medium and forming on an image output medium a color image corresponding to the original color image, the image input medium and the image output medium having first and second gamuts, respectively, the first and second gamuts being defined as reproducible ranges of the image input medium and the image output medium, said color image forming apparatus comprising:

image input means for inputting a color image data representative of color of each picture element of the original color image, the color of each picture element thus represented by the color image data being positioned inside of the first gamut;

color distribution detecting means for detecting color distribution of the original color image to generate color distribution information of the original color image;

control signal producing means for producing a control signal on the basis of the color image data, the control signal having a value corresponding to that calculated through color-compression transformation of the color image data, the color-compression transformation being determined on the basis of the color distribution information of the original color image, color represented by the control signal corresponding to the color of each picture element of the original color image and being positioned inside of the second gamut; and image recording means for recording, on the basis of the control signal, the color represented by the control signal on the image output medium, to thereby record on the image output medium a color image corresponding to the original color image.

* * * * *